United States Patent
Shindome et al.

(10) Patent No.: US 8,137,775 B2
(45) Date of Patent: *Mar. 20, 2012

(54) BLOW MOLDED CONTAINER AND METHOD FOR PRODUCING THE SAME

(75) Inventors: Hiroyuki Shindome, Kurashiki (JP); Naohiko Uchiumi, Okayama (JP); Kaoru Ikeda, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 132 days.

This patent is subject to a terminal disclaimer.

(21) Appl. No.: 10/895,832

(22) Filed: Jul. 22, 2004

(65) Prior Publication Data

US 2005/0038163 A1 Feb. 17, 2005

(30) Foreign Application Priority Data

Aug. 11, 2003 (JP) ................. 2003-291305

(51) Int. Cl.
*B32B 1/02* (2006.01)
*B32B 27/08* (2006.01)
*B32B 27/30* (2006.01)
*B32B 27/32* (2006.01)
*B32B 27/34* (2006.01)
*B32B 27/36* (2006.01)

(52) U.S. Cl. ............ 428/35.7; 428/34.1; 428/36.6; 428/36.92

(58) Field of Classification Search ............ 428/34.1, 428/34.8, 35.2, 35.3, 35.4, 35.5, 35.7, 35.8, 428/35.9, 36.6, 36.7, 36.92; 524/401, 404, 524/405, 417, 424

See application file for complete search history.

(56) References Cited

U.S. PATENT DOCUMENTS

| | | | |
|---|---|---|---|
| 6,174,949 B1 | 1/2001 | Ninomiya et al. | |
| 6,395,358 B1 * | 5/2002 | Tai et al. | 428/36.7 |
| 6,432,552 B1 * | 8/2002 | Onishi | 428/522 |
| 6,485,842 B1 | 11/2002 | Shindome et al. | |
| 7,524,895 B2 * | 4/2009 | Ikeda et al. | 524/404 |
| 2003/0060550 A1 | 3/2003 | Inomata et al. | |
| 2004/0013893 A1 | 1/2004 | Nakaya et al. | |

FOREIGN PATENT DOCUMENTS

| | | |
|---|---|---|
| EP | 1 090 953 | 4/2001 |
| EP | 1 108 744 A2 | 6/2001 |
| JP | 10-67898 | 3/1998 |
| JP | 2001-234008 | 8/2001 |
| WO | WO 01/96464 | 12/2001 |
| WO | WO 02/053639 A1 | 7/2002 |
| WO | WO 03/068847 | 8/2003 |

OTHER PUBLICATIONS

U.S. Appl. No. 12/393,666, filed Feb. 26, 2009, Ikeda, et al.
U.S. Appl. No. 12/393,532, filed Feb. 26, 2009, Ikeda, et al.

* cited by examiner

*Primary Examiner* — Walter B Aughenbaugh
(74) *Attorney, Agent, or Firm* — Oblon, Spivak, McClelland, Maier & Neustadt, L.L.P.

(57) ABSTRACT

A blow molded container made of an ethylene-vinyl alcohol copolymer resin composition, wherein the composition contains 0.1 to 20 μmol/g, in terms of alkali metal, of an alkali metal salt (A), 0 to 2 μmol/g of a carboxylate radical (C1) which is extracted through an immersion treatment in water at 95° C. for 10 hours, and 0 to 40 μmol/g of a carboxylate radical (C2) which is extracted through an immersion treatment in a 0.05 N aqueous sodium hydroxide solution at 95° C. for 10 hours.

9 Claims, No Drawings

BLOW MOLDED CONTAINER AND METHOD FOR PRODUCING THE SAME

BACKGROUND OF THE INVENTION

1. Field of the Invention

The present invention relates to a blow molded container comprising an ethylene-vinyl alcohol copolymer resin composition and the method for producing the same.

2. Description of the Related Art

Ethylene-vinyl alcohol copolymer, which may henceforth be abbreviated as EVOH, is a useful macromolecular material superior in oxygen barrier property, oil resistance, antistatic property and mechanical strength and is in wide use as various types of packaging material such as films, sheets and containers fabricated from the films or sheets. EVOH pellets are molded into various molded articles by various methods and they are often melt kneaded and then extrusion molded. However, in general, when molding an EVOH resin, it is necessary to set the melting temperature to be 200° C. or higher. Therefore, EVOH containing no additives is liable to deteriorate when being extrusion molded and it accordingly may cause deterioration in product quality due to formation of fish eyes or hard spots in products. In addition, it is necessary to add some additives in order also to improve the interlayer adhesiveness when using it with other resins while laminating them.

In a pamphlet of WO 99/05213 (U.S. Pat. No. 6,174,949), disclosed is an EVOH resin composition containing a boron compound as an essential component, acetic acid as an optional component, and at least one compound as an essential component selected among acetic acid salts and phosphoric acid compounds, the content of each component based on 100 parts by weight of EVOH being 0.001 to 1 part by weight in terms of boron for the boron compound, 0 to 0.05 part by weight for acetic acid, 0.001 to 0.05 part by weight in terms of metal for the acetic acid salt, and 0.0005 to 0.05 part by weight in terms of phosphate radical for the phosphoric acid compound. This resin composition is reported to be an EVOH resin composition having been improved in long-run workability, appearance and interlayer adhesiveness. The publication discloses that the purpose of the incorporation of the acetic acid salt is to improve the long-run workability or the interlayer adhesiveness.

JP-A-164059/2001 (EP-A-1090953) discloses an EVOH resin composition which is characterized in that, when it is heated to melt, its MFR shows specific behavior and that it contains from 50 to 500 ppm of carboxylic acid having a molecular weight of less than 75, from 50 to 500 ppm, in terms of metal element, of an alkali metal salt, from 10 to 120 ppm, in terms of metal element, of an alkaline earth metal salt, from 10 to 200 ppm, in terms of phosphate radical, of a phosphoric acid compound and from 50 to 2000 ppm, in terms of boron element, of a boron compound. This resin composition is reported to be an EVOH resin composition which is superior in appearance and in long-run workability at the time of its melt molding, less suffers yellowing when being recycled, and shows a superior interlayer adhesiveness when being fabricated into a laminate. In this invention, the alkali metal salt and the boron compound are added for improving the interlayer adhesiveness and for improving the long-run workability, respectively.

As a typical method for producing pellets of EVOH containing the additives, a method in which hydrous EVOH pellets are contacted with an aqueous solution containing the additives is disclosed. According to this method, it is easy to control the amounts of minor components contained in the EVOH pellets through an adjustment of the solution concentration and, therefore, it is possible to obtain pellets of stable quality by contacting them with the aqueous solution and then drying.

As mentioned above, the addition of an alkali metal salt to an EVOH resin in order to improve the interlayer adhesiveness has been done conventionally. The alkali metal salt is added typically in the form of an acetate. In many cases, acetic acid, which is not in the form of a salt, is also added simultaneously. Such an EVOH resin composition containing an acetate radical, however, may emit an acetic acid smell. One of the main applications of EVOH resin compositions is food packaging containers. In the market, EVOH resin compositions emitting smell as less as possible have been sought. In addition, EVOH resin compositions having a more improved melt stability and a superior long-run workability have been awaited.

On the other hand, in many cases where EVOH resin composition pellets are produced by contacting hydrous EVOH pellets with an aqueous solution containing acetic acid or its salt, acetic acid is released to the atmosphere when the hydrous pellets resulting from the contact are dried. Therefore, the surrounding environment and the working environment may be affected.

SUMMARY OF THE INVENTION

The present invention was created for solving the above-mentioned problems. The object of the present invention is to provide a blow molded container comprising an EVOH resin composition which generates less sourness and which is superior in interlayer adhesiveness. Another object of the present invention is to provide a method for producing a blow molded container which has an improved melt stability and also has a superior long-run workability. According to the present invention, it is also possible to provide an environmentally friendly production process in which no carboxylic acid such as acetic acid is released during the production and molding of the EVOH resin composition.

The above objects can be achieved by providing a blow molded container made of an ethylene-vinyl alcohol copolymer resin composition that contains 0.1 to 20 µmol/g, in terms of alkali metal, of an alkali metal salt (A), 0 to 2 µmol/g of a carboxylate radical (C1) which is extracted through an immersion treatment in water at 95° C. for 10 hours, and 0 to 40 µmol/g of a carboxylate radical (C2) which is extracted through an immersion treatment in a 0.05 N aqueous sodium hydroxide solution at 95° C. for 10 hours.

The above objects can also be achieved by providing a blow molded container made of an ethylene-vinyl alcohol copolymer resin composition, wherein the composition contains 0.1 to 20 µmol/g, in terms of alkali metal, of an alkali metal salt (A) and 0 to 2 µmol/g of a carboxylate radical (C1) which is extracted through an immersion treatment in water at 95° C. for 10 hours, and wherein the degree of saponification is 99.7 to 100 mol %.

It is preferable that in these blow molded containers, the ethylene content of the ethylene-vinyl alcohol copolymer be 5 to 60 mol %. In addition, it is preferable that the alkali metal salt (A) be a potassium salt. In addition, it is also preferable that the composition further contain 1 to 200 µmol/g, in terms of boron element, of a boron compound (B). Moreover, it is also preferable that the relation between the content (a: µmol/g) of the alkali metal salt (A) in the ethylene-vinyl alcohol copolymer resin composition in terms of alkali metal and the ethylene content (ET: mol %) of the ethylene-vinyl alcohol copolymer satisfy the following formula (1):

$$0.95 \times \exp(0.039 \times ET) - 2 \leq a \leq 0.95 \times \exp(0.039 \times ET) + 2 \quad (1)$$

In one preferable embodiment, the aforementioned blow molded containers comprise a multilayer structure having a layer of the ethylene-vinyl alcohol copolymer resin composition and a layer of another thermoplastic resin. In such a case, it is preferable that the thermoplastic resin be polyolefin. It is also preferable that the thermoplastic resin be polyamide or polyester. Moreover, it is also preferable that the layer of the ethylene-vinyl alcohol copolymer resin composition be the innermost layer.

The objects described above can be achieved also by providing a method for producing a blow molded container, the method comprising blow molding an ethylene-vinyl alcohol copolymer resin composition obtained by contacting an ethylene-vinyl alcohol copolymer with an aqueous solution containing both carbon dioxide gas and at least one additive selected from the group consisting of an alkali metal salt (A) and a boron compound (B) and then drying the copolymer until the water content is reduced to 1% by weight or less. It is also preferable that the ethylene-vinyl alcohol copolymer resin composition be co-extrusion blow molded or co-injection blow molded together with another thermoplastic resin. In such a case, it is also preferable that the blow molding be conducted at a die temperature or a nozzle temperature of 250° C. or higher.

The blow molded containers of the present invention generate less sourness and are superior in interlayer adhesiveness. The EVOH resin composition employed in the present invention has an improved melt stability and is superior in long-run workability. Therefore, it is easy to obtain blow molded articles having an excellent appearance therefrom. In addition, the EVOH resin composition employed in the present invention releases no carboxylic acid such as acetic acid during its production and its molding into a blow molded container and therefore it is possible to provide an environmentally friendly production process.

DESCRIPTION OF THE PREFERRED EMBODIMENTS

First, described is the method for producing the EVOH resin composition for use in the present invention. A preferable method is a method for producing an ethylene-vinyl alcohol copolymer resin composition, wherein an ethylene-vinyl alcohol copolymer resin is contacted with an aqueous solution containing both carbon dioxide gas and at least one additive selected from the group consisting of an alkali metal salt (A) and a boron compound (B).

To make EVOH resin contain at least one additive selected from the group consisting of an alkali metal salt (A) and a boron compound (B), conventionally employed is a method in which an EVOH is contacted with an aqueous solution containing these additives. The EVOH resin composition used in the present invention is characterized in that an EVOH is contacted with an aqueous solution containing carbon dioxide gas as well as those additives.

In order to improve the interlayer adhesiveness in a multilayer structure including an EVOH layer, it is desirable that the EVOH resin composition contain an alkali metal salt (A). Therefore, EVOH resin is, in many cases, immersed in an aqueous solution containing the alkali metal salt (A), especially an acetic acid salt of alkali metal. If, however, the solution used for the immersion is alkaline, the stability at the time of melt molding often deteriorates. For eliminating this problem, an acid, especially a carboxylic acid typified by acetic acid, is further added in many cases.

However, if the content of carboxylate radical derived from carboxylic acid or its salt is large, a resulting EVOH resin composition will often generate a carboxylic acid odor and sourness. Therefore, it may cause problems when being used for a food packaging application. In addition, there also is a problem in that a carboxylic acid is released during the drying conducted after the immersion in the aqueous solution containing the additives. A method therefore has been awaited in which the alkali metal salt (A) is contained and a carboxylate radical is contained in a minimized amount but an aqueous solution containing additives is not made alkaline. The resin composition used in the present invention can solve this problem not by using acetic acid but by making the aqueous solution containing the alkali metal salt (A) contain carbon dioxide gas.

For inhibiting generation of deposits at a dielip when melt molding an EVOH resin composition, it is desirable to add a boron compound (B). Therefore, in many cases, EVOH resin is immersed in an aqueous solution containing a boron compound (B). However, even if a boron compound (B) is contained, the inhibition of the generation of deposits at a dielip may still be insufficient for some applications. Further improvements are therefore awaited.

Causing the aqueous solution containing a boron compound (B) to contain carbon dioxide gas will make it possible to further improve the EVOH resin composition used in the present invention. In other words, the reduction in content of the carboxylate radical through use of an aqueous solution containing carbon dioxide gas and the addition of the boron compound (B) enable EVOH resin compositions superior in long-run workability to be obtained.

The EVOH for use in the invention is preferably one obtained by saponifying an ethylene-vinyl ester copolymer. Particularly preferred is one obtained by saponifying an ethylene-vinyl acetate copolymer. For obtaining a molded article superior in both gas barrier properties and melt moldability, the ethylene content of the EVOH is preferably from 5 to 60 mol %. If the ethylene content is less than 5 mol %, the melt moldability may be worse. If it exceeds 60 mol %, the gas barrier properties may be insufficient. The lower limit of the ethylene content is more preferably 15 mol % or more, and still more preferably 20 mol % or more. On the other hand, the upper limit of the ethylene content is more preferably 55 mol % or less, and still more preferably 50 mol % or less.

The degree of saponification of vinyl acetate moieties is preferably 80 to 100 mol %. For obtaining a molded article superior in gas barrier properties, the degree of saponification is more preferably 95 mol % or more, still more preferably 98 mol % or more, and particularly preferably 99 mol % or more. If the degree of saponification is less than 80 mol %, the barrier properties, the long-run workability and the moisture resistance may be worse. In the case of producing an EVOH composition superior particularly in melt stability and also superior in long-run workability, the degree of saponification of the EVOH is preferably 99.7 mol % or more, more preferably 99.8 mol % or more, still more preferably 99.9 mol %, and particularly preferably 99.95 mol %.

During the copolymerization of ethylene and vinyl acetate, other vinyl esters of fatty acids (e.g., vinyl propionate, vinyl pivalate, etc.) may be used together. The EVOH may contain from 0.0002 to 0.2 mol % of a vinylsilane compound as a comonomer. The vinylsilane compounds includes, for example, vinyltrimethoxysilane, vinyltriethoxysilane, vinyltri(β-methoxyethoxy)silane and γ-methacryloxypropylmethoxysilane. Of these, vinyltrimethoxysilane and vinyltriethoxysilane are suitably employed.

The method of producing the EVOH for use in the invention is described concretely. The polymerization of ethylene and vinyl acetate is not restricted to solution polymerization and may be any of solution polymerization, suspension polymerization, emulsion polymerization and bulk polymerization. These may be conducted either in continuous mode and in batch mode. The polymerization conditions used in solution polymerization are as follows.

Solvent: Alcohols are preferred, but any other organic solvents (e.g., dimethylsulfoxide) capable of dissolving ethylene, vinyl acetate and ethylene-vinyl acetate copolymers may also be used. Alcohols usable herein include methyl alcohol, ethyl alcohol, propyl alcohol, n-butyl alcohol and t-butyl alcohol. Especially preferred is methyl alcohol.

Catalyst: Usable are azonitrile-type initiators such as 2,2-azobisisobutyronitrile, 2,2-azobis-(2,4-dimethylvaleronitrile), 2,2-azobis-(4-methyl-2,4-dimethylvaleronitrile), 2,2-azobis-(4-methoxy-2,4-dimethylvaleronitrile), and 2,2-azobis-(2-cyclopropylpropionitrile); organic peroxide-type initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Temperature: 20 to 90° C., preferably 40° C. to 70° C.

Time (average residence time in the case of continuous mode): 2 to 15 hours, preferably 3 to 11 hours.

Degree of polymerization: 10 to 90%, preferably 30 to 80% based on the vinyl ester fed into the reactor.

Resin content of the solution after polymerization: 5 to 85%, preferably 20 to 70%.

Ethylene content in copolymers: Preferably 5 to 60 mol %, more preferably 15 to 55 mol %, even most preferably 20 to 50 mol %.

In addition to ethylene and vinyl acetate, any other minor comonomers capable of copolymerizing with them may be present. The comonomers include, for example, α-olefins such as propylene, isobutylene, α-octene and α-dodecene; unsaturated acids such as acrylic acid, methacrylic acid, crotonic acid, maleic acid and itaconic acid; and their anhydrides, salts, or mono- or di-alkyl esters; nitriles such as acrylonitrile and methacrylonitrile; amides such as acrylamide and methacrylamide; olefinsulfonic acids such as ethylenesulfonic acid, allylsulfonic acid and methallylsulfonic acid; and their salts; alkyl vinyl ethers, vinyl ketones, N-vinylpyrrolidone, vinyl chloride and vinylidene chloride.

After the monomers have been polymerized for a predetermined period of time to give the intended copolymer having a predetermined degree of polymerization, a polymerization inhibitor may be added thereto, if desired. Then, the unreacted ethylene gas is evaporated away, and the unreacted vinyl acetate is purged away. To purge the unreacted vinyl acetate from the ethylene-vinyl acetate copolymer solution after the removal of ethylene by evaporation, for example, the copolymer solution is continuously fed, downward at a constant flow rate, into a column filled with raschig rings at its top while a vapor of an organic solvent such as methanol or the like is jetted into the column from its bottom, whereby a mixed vapor of the organic solvent such as methanol or the like and the unreacted vinyl acetate is run off from the column through its top, and the copolymer solution from which the unreacted vinyl acetate has been removed is taken out of the column through its bottom.

An alkali catalyst is added to the copolymer solution from which the unreacted vinyl acetate has been removed, whereby the vinyl acetate moiety of the copolymer is saponified. For this, employable is any of continuous or batchwise saponification. The alkali catalyst includes, for example, sodium hydroxide, potassium hydroxide and alkali metal alcoholates. The solvent for use in the saponification is preferably methanol. For example, the conditions for saponification are as follow:

Concentration of copolymer solution: 10 to 50%.

Reaction temperature: 30 to 150° C.

Amount of catalyst to be used: 0.005 to 0.6 equivalent (based on the vinyl acetate moiety).

Time (average residence time in the case of continuous mode): 10 minutes to 6 hours.

Generally, in continuous saponification, a resin with a higher degree of saponification can be obtained by use of a catalyst in an amount less than that used in batchwise saponification because in continuous saponification the methyl acetate resulting from the saponification can be removed more efficiently. Continuous saponification must be carried out at higher temperatures for the purpose of preventing EVOH formed in the saponification from forming crystals. In continuous saponification, therefore, it is preferable to use a reaction temperature and an amount of catalyst falling within the ranges shown below.

Reaction temperature: 70 to 150° C.

Amount of catalyst to be used: 0.005 to 0.1 equivalent (based on the vinyl acetate moiety).

The degree of saponification achieved by the saponification varies depending on the purpose of saponification, but is preferably at least 80 mol % of the vinyl acetate moieties, more preferably at least 95 mol % thereof, even more preferably at least 98 mol % thereof, still more preferably at least 99 mol % thereof. The degree of saponification can be varied in any desired manner by controlling the conditions for saponification.

As mentioned above, in the case of producing an EVOH composition superior particularly in melt stability and also superior in long-run workability, the degree of saponification of the EVOH is preferably 99.7 mol % or more, more preferably 99.8 mol % or more, still more preferably 99.9 mol %, and particularly preferably 99.95 mol %. For the purpose of obtaining such EVOH, it is preferable to further control saponification conditions as follows.

To obtain an EVOH with a degree of saponification of 99.9 mol % or higher, continuous saponification is preferable. Examples of the method for obtaining a high degree of saponification by use of continuous saponification include a method in which a catalyst is added at two or more sites in the saponification reaction column, a method in which an increased amount of catalyst is employed, and a method in which an increased amount of methanol is jetted into the saponification reaction column from its bottom. Examples of the method for obtaining an EVOH with a degree of saponification of 99.9 mol % or higher by use of batchwise saponification include a method in which a catalyst is added separately in two or more portions, a method in which an increased amount of catalyst is employed, and a method in which an increased amount of methanol vapor or nitrogen gas is jetted into the saponification reactor.

The method for producing EVOH pellets from an alcohol solution of the resulting EVOH after the saponification is not particularly limited. Preferably, hydrous pellets are obtained by forming a strand-like solid from an alcoholic solution of EVOH in a coagulation bath and then cutting the strand. Before the forming of the strand, the EVOH concentration may be made higher than that at the time of the saponification by concentrating the alcoholic solution or, alternatively, a solution of EVOH in a water/alcohol mixed solvent or a hydrous composition of EVOH may be prepared through a replacement of part or the whole of methanol by water. Hydrous pellets are obtained by extruding the resulting solution or composition into water or into an aqueous alcohol solution containing a small amount of alcohol to form a strand-like solid and then cutting it. Alternatively, pellets can be produced by cutting the extrudate still in a flowing state without making it form a strand-like solid, and then solidifying it.

The hydrous pellets obtained in the manner described above is porous. Therefore, it is easy to remove the saponification catalyst residue by washing with water. It is also easy to add additives to the pellets or to dry the pellets after the removal. Such hydrous pellets preferably have a water content of 10 to 80% by weight because it will result in a great operational advantage. The water content is more preferably 20% by weight or more, and still more preferably 30% by weight or more. In addition, the water content is more preferably 70% by weight or less, and still more preferably 60% by weight or less.

The thus-obtained hydrous pellets usually contain a saponification catalyst residue, namely an alkali metal salt, e.g. sodium acetate, which will cause a yellowing problem or the like. Therefore, it is desirable to remove the alkali metal salt by washing. The content of an alkali metal salt in hydrous pellets before washing is in general approximately from 100 to 10000 µmol/g (EVOH weight), in terms of alkali metal. The washing method is not particularly restricted, but washing with water is preferred. The water used as a washing liquid herein may be an aqueous solution of acid such as acetic acid in order to remove alkali metal ions efficiently. It is also desirable to reduce the content of the saponification catalyst residue efficiently by combining the washing with water and the washing with acid.

It is desirable to reduce the alkali metal content in hydrous pellets after the washing to 0 to 50 µmol/g (EVOH weight), in terms of alkali metal. The upper limit of the alkali metal content is more preferably 40 µmol/g, more preferably 30 µmol/g, and particularly preferably 20 µmol/g. The saponification catalyst residue is generally contained in the form of an alkali metal salt of acetic acid. Therefore, making hydrous pellets after washing have a sufficiently reduced alkali metal content in advance makes it easy to obtain an EVOH composition having a reduced carboxylate content.

The method for washing the hydrous pellets is not particularly restricted. Any of a batch treatment vessel and a continuous treatment vessel may be employed. In particular, a method in which pellets are treated while being fed continuously in a column vessel is preferable from the viewpoint of productivity.

For the production of the EVOH resin composition used in the present invention, suitably adopted is a method for producing an ethylene-vinyl alcohol copolymer resin composition, wherein an ethylene-vinyl alcohol copolymer resin is contacted with an aqueous solution containing both carbon dioxide gas and at least one additive selected from the group consisting of an alkali metal salt (A) and a boron compound (B). The aqueous solution with which the EVOH resin is contacted is an aqueous solution containing at least one additive selected from the group consisting of an alkali metal salt (A) and a boron compound (B) and also containing carbon dioxide gas.

The amount of the carbon dioxide gas contained in the aqueous solution is not particularly limited and may be adjusted appropriately. However, it is necessary to dissolve carbon dioxide gas in an amount more than the amount in which carbon dioxide gas contained in the air dissolves spontaneously. The concentration of carbon dioxide gas (the sum of free carbon dioxide and carbonic acid) in the aqueous solution is preferably 0.5 mmol/L or more, more preferably 2 mmol/L or more, and still more preferably 10 mmol/L or more. In order to increase the solubility of carbon dioxide gas, the treatment may be conducted under elevated pressure approximately from 1.5 to 10 atm.

When adopting a method of treating pellets by feeding them continuously by use of a continuous treatment vessel, especially, a column vessel, a too high carbon dioxide gas concentration in the aqueous solution may result in formation of bubbles around EVOH pellets to have some adverse effect on the sedimentation property of resin. Therefore, when such a continuous treatment process is applied, it is preferable in some cases that the carbon dioxide gas concentration in an aqueous solution be lower than the saturated carbon dioxide gas concentration. In such cases, the carbon dioxide gas concentration is set at a value lower than the saturated carbon dioxide gas concentration. It preferably is set to be not higher than 0.95 time the saturated carbon dioxide gas concentration, and more preferably is set to be not higher than 0.9 time the saturated carbon dioxide gas concentration. The concentration is determined depending also on the temperature of a treatment solution and the pressure. On the other hand, when a batch treatment vessel is used, no sedimentation property problem usually arises. However, the upper limit of the carbon dioxide gas concentration may be set in the same manner as continuous treatment vessels.

In the interest of securing interlayer adhesiveness and long-run workability, it is preferable that the aqueous solution contain an alkali metal salt (A). A preferred range of the content of the alkali metal salt (A) is influenced by the water content of hydrous pellets. In general, however, it is preferably 0.05 to 40 mmol/L. A more preferable lower limit of the content of the alkali metal salt (A) in the aqueous solution is 0.1 mmol/L. A more preferable upper limit is 20 mmol/L. As described later, a desirable content of the alkali metal salt (A) in the resin composition varies depending on the ethylene content of EVOH. It therefore is preferable to adjust the content of the alkali metal salt (A) in the aqueous solution in correspondence therewith.

The type of cations of the alkali metal salt (A) is not specifically restricted. Although the salt is selected from lithium salts, sodium salts, potassium salts, rubidium salts and cesium salts, sodium salts and potassium salts are preferable. Potassium salts are particularly preferable. The use of a potassium salt can yield an EVOH resin composition superior in both interlayer adhesiveness and long-run workability.

The type of anions of the alkali metal salt (A) is not also specifically restricted. The alkali metal salt can be added in the form of carbonate, hydrogencarbonate, phosphate, hydrogenphosphate, hydroxide, carboxylate or the like. Especially, it is preferable to add the salt in the form of carbonate, hydrogencarbonate, hydrogenphosphate or hydroxide. Moreover, it is also preferable to add the alkali metal salt in the form of borate. However, in light of the purpose of the present invention to reduce the content of carboxylate radicals, it is not preferable that the alkali metal salt be a carboxylate.

It is preferable that the aqueous solution contain a boron compound (B) because the generation of deposits at a dielip at the time of melt-molding can be inhibited. The concentration of the boron compound (B) in the aqueous solution is preferably 0.1 to 50 mmol/L in terms of boron element because this makes dry resin composition pellets possible to contain an appropriate amount of boron compound (B). The lower limit of the concentration of the boron compound (B) is more preferably 0.5 mmol/L or more, and still more preferably 1 mmol/L or more. The upper limit thereof is more preferably 40 mmol/L or less, and still more preferably 30 mmol/L or less. If the concentration exceeds 50 mmol/L, the EVOH resin composition is liable to gelate and the appearance of molded articles may deteriorate.

Examples of the boron compound (B) for use in the preparation of the aqueous solution include, but are not limited to, boric acids, boric acid esters, boric acid salts and borohydrides. Specifically, the boric acids include orthoboric acid, metaboric acid and tetraboric acid; the boric acid esters include triethyl borate and trimethyl borate; and the boric acid salts include alkali metal salts and alkaline earth salts of boric acids such as those mentioned above and borax. Among these compounds, preferred is orthoboric acid, which henceforth is sometimes referred simply as boric acid.

In view of the object of the present invention, it is desirable that the aqueous solution contain no carboxylic acid or its salt (C). It, however, should be noted that this does not exclude a case where a carboxylic acid or its salt (C) remaining in the EVOH resin is eluted into the aqueous solution to be contained therein. Moreover, a case where the aqueous solution contains a carboxylic acid or its salt (C) unless the effect of the present invention is affected is not excluded as well.

In order to balance the long-run workability, the yellowing resistance at the time of melt molding, the yellowing resistance especially in high-temperature molding and interlayer adhesiveness, it is desirable for the aqueous solution to contain a phosphoric acid compound (D). Containing the phosphoric acid compound (D) in an appropriate amount makes it possible to inhibit yellowing of molded articles and generation of gels and hard spots when melt-molding the resulting EVOH resin composition. When adding a phosphoric acid compound (D), the upper limit of the concentration of the phosphoric acid compound (D) in the aqueous solution, in terms of phosphate radical, is preferably 10 mmol/L, more preferably 5 mmol/L, still more preferably 3.5 mmol/L, and most preferably 2.5 mmol/L. On the other hand, when adding a phosphoric acid (D), the lower limit of the concentration of the phosphoric acid compound (D) in the aqueous solution, in terms of phosphate radical, is preferably 0.01 mmol/L, more preferably 0.03 mmol/L, still more preferably 0.05 mmol/L, and most preferably 0.1 mmol/L.

As the phosphoric acid compound (D) for use in the preparation of the aqueous solution, inorganic phosphoric acid compounds are preferably employed. Examples of such compounds include various acids, such as phosphoric acid and phosphorous acid, and their salts. Phosphoric acid salts may be contained in any form of primary phosphate, secondary phosphate and tertiary phosphate. The type of their cations is not also particularly restricted, but alkali metal salts are preferred. In particular, addition of a phosphoric acid compound (D) in the form of sodium dihydrogenphosphate, potassium dihydrogenphosphate, disodium hydrogenphosphate or dipotassium hydrogenphosphate is preferred.

The aqueous solution may contain an alkaline earth metal salt (E). However, it is inappropriate to add it in a large amount because alkali earth metal salts easily form slightly soluble. In some applications, addition of the alkaline earth metal salt (E) in an appropriate amount makes it is possible to improve the long-run workability when melt-molding the resulting EVOH resin composition. Addition of the alkaline earth metal salt (E) may be optionally conducted. When adding, the concentration of the alkaline earth metal salt (E) in the aqueous solution ranges 0 to 10 mmol/L in terms of alkaline earth metal. The upper limit thereof is more preferably 5 mmol/L or less, and still more preferably 3 mmol/L or less.

The type of the cation of the alkaline earth metal salt (E) is not particularly restricted. Examples of the salt include magnesium salts, calcium salts, barium salts and strontium salts. Magnesium salts and calcium salts are preferred. The type of the anion of the alkaline earth metal salt (E) is not also restricted particularly. The alkali metal salt can be added in the form of carbonate, hydrogencarbonate, phosphate, hydrogenphosphate, hydroxide, carboxylate or the like. Especially, it is preferable to add the salt in the form of carbonate, hydrogencarbonate, hydrogenphosphate or hydroxide. In general, many of the alkaline earth metal salts are slightly soluble in water, but their solubilities are increased by the presence of carbonate. However, in light of the purpose of the present invention to reduce the content of carboxylate radicals, it is not preferable that the alkali metal salt be a carboxylate.

The pH of the aqueous solution containing the additives and carbon dioxide gas is preferably 3.5 to 6.5. Making an aqueous solution contain at least a certain amount of carbon dioxide gas permits the aqueous solution to be as acidic as described above. The pH value is more preferably 3.8 or more and still more preferably 4 or more. The pH value is more preferably 6.3 or less, still more preferably 6.0 or less, and most preferably 5.8 or less.

The method for preparing the aqueous solution containing the additives and carbon dioxide gas is not particularly restricted. At least one additive selected from the group consisting of an alkali metal salt (A) and a boron compound (B) may be added to an aqueous solution in which carbon dioxide gas was dissolved in advance. Conversely, carbon dioxide gas may be dissolved in an aqueous solution in which at least one additive selected from the group consisting of an alkali metal salt (A) and a boron compound (B) was dissolved in advance. Alternatively, the foregoing two types of aqueous solutions prepared in advance may be mixed.

The method for contacting EVOH resin with the aqueous solution is not particularly restricted, but a method in which the EVOH resin is immersed in the aqueous solution is desirable. The EVOH resin may have any shape during its immersion in the aqueous solution, such as powder, granule, sphere and circular cylinder pellet. For example, it is preferable to contact hydrous EVOH pellets prepared in the matter described previously with the aforementioned aqueous solution. To immerse the hydrous pellets in the aqueous solution permits the EVOH resin pellets to contain the alkali metal salt (A) or the boron compound (B) efficiently and homogeneously. The water content of the hydrous pellets before the immersion in the aqueous solution is preferably 10 to 80% by weight. The water content is more preferably 20% by weight or more, and still more preferably 30% by weight or more. In addition, it is more preferably 75% by weight or less, and still more preferably 70% by weight or less.

The temperature of the aqueous solution when it is contacted with EVOH resin is not particularly limited, but it is preferably 10 to 90° C. If the temperature is lower than 10° C., it may take too much time to make the EVOH pellets to contain the alkali metal salt (A) or the boron compound (B) homogeneously. If it exceeds 90° C., the saturation solubility of carbon dioxide gas will decrease and it will be difficult to make the solution contain a sufficient amount of carbon dioxide gas in some cases. In addition, pellets may fuse and attach to each other. The temperature of the aqueous solution is more preferably 20° C. or higher, and still more preferably 30° C. or higher. In addition, it is more preferably 85° C. or lower, and still more preferably 80° C. or lower. When the contact is conducted at a temperature of 70° C. or higher, the solubility of carbonic acid becomes small and, therefore, it is preferable to conduct the contact under pressure almost at 1.5 to 10 atm.

The desirable range of the time for which EVOH resin is contacted with the aqueous solution varies depending on the form of the EVOH resin. For pellets having a size approximately ranging from 1 to 10 mm, the time is preferably 1 hour or longer, and still more preferably 2 hours or longer.

The method for contacting EVOH resin with the aqueous solution is not particularly restricted. It is permitted to contact the EVOH resin with water in advance and thereafter dissolve carbon dioxide gas or additives in water. However, preferred is a method in which an aqueous solution prepared in advance by dissolving those ingredients is contacted with the EVOH resin because an EVOH resin composition with a stable quality which contains additives uniformly can be obtained.

Regarding the mode for contacting the EVOH resin with the aqueous solution, any of a batch mode and a continuous mode may be adopted. In the continuous mode, a preferable example is a method in which an EVOH resin is moved downward slowly in a column-type vessel and the resin is simultaneously contacted with an aqueous solution which is fed continuously.

It is also permitted to prepare two or more aqueous solutions and then carry out the contact in two or more times. For example, a method which comprises contacting first with an aqueous solution containing an alkali metal salt (A) or a boron compound (B) only and then contacting with an aqueous solution containing carbon dioxide gas in addition to the alkali metal salt (A) or the boron compound (B) may also be adopted.

Moreover, another adoptable method is one comprising contacting an EVOH resin with an aqueous solution containing carbon dioxide gas in addition to an alkali metal salt (A) or a boron compound (B) through immersion of the resin in the solution and then charging the resin to an extruder followed by contacting, in the extruder, the resin with an aqueous solution containing an alkali metal salt (A), a boron compound (B), a phosphoric acid compound (D) or an alkaline earth metal salt (E) and melt kneading the mixture.

EVOH resin, preferably EVOH resin pellets, is contacted with the aqueous solution first, then dewatered if necessary, and there after is subjected to a drying step. The drying method is not particularly restricted. A hot air dryer or the like may be employed. The EVOH resin may also be dried while being melt-kneaded in an extruder with a vent. As a dryer, either a fluidized dryer or a static dryer is available. Alternatively, these dryers may be used in combination. Preferred is a method comprising drying by the fluidized drying method first and subsequently drying by the static drying method. The drying temperature is not particularly limited, but a temperature from about 70 to 120° C. is generally employed. The temperature may be increased with the progress of the drying. The water content after the drying is generally 1% by weight or less, and preferably 0.5% by weight of less. The thus obtained dry pellets are subjected to the following molding step.

In the above-described method for producing an EVOH resin composition, a resin composition containing almost no carboxylate radical can be obtained. Therefore, it is possible to provide an environmentally friendly production method in which no carboxylic acid volatilizes in this drying step and no carboxylic acid is released to the surrounding.

The EVOH resin composition employed suitably in the present invention is an EVOH resin composition that contains 0.1 to 20 μmol/g, in terms of alkali metal, of an alkali metal salt (A), 0 to 2 μmol/g of a carboxylate radical (C1) which is extracted through an immersion treatment in water at 95° C. for 10 hours, and 0 to 40 μmol/g of a carboxylate radical (C2) which is extracted through an immersion treatment in a 0.05 N aqueous sodium hydroxide solution at 95° C. for 10 hours.

This EVOH resin composition is a resin composition which releases less odor or less sourness and which is superior in long-run workability at the time of melt molding. The EVOH resin composition is preferably a composition produced by the above-described production method, but it is not restricted to one produced by that method.

This resin composition contains 0.1 to 20 μmol/g, in terms of alkali metal, of an alkali metal salt (A). Containing the alkali metal salt (A) improves the resin composition itself in interlayer adhesiveness, yellowing resistance and long-run workability at the time of melting. When the content is less than 0.1 μmol/g, both the yellowing resistance and the long-run workability at the time of melting as well as the interlayer adhesiveness are insufficient. If the content exceeds 20 μmol/g, the yellowing resistance at the time of melting will be poor. When the content is within the range of 0.1 to 0.3 μmol/g, the yellowing resistance and the long-run workability at the time of melting are relatively good. However, when being with other resins in a multilayer structure, use of a normal acid anhydride-modified adhesive resin will achieve an insufficient adhesive strength. The lower limit of the content of the alkali metal salt (A) is more preferably 0.3 μmol/g or more, and still more preferably 0.5 μmol/g or more. The upper limit of the content of the alkali metal salt (A) is preferably 15 μmol/g or less, more preferably 10 μmol/g or less, and particularly preferably 8 μmol/g or less.

It is preferable that the content of the alkali metal salt (A) and the ethylene content of the EVOH satisfy the following formula (1):

$$0.95 \times \exp(0.039 \times ET) - 2 \leq a \leq 0.95 \times \exp(0.039 \times ET) + 2 \quad (1)$$

wherein a is the content (μmol/g) of the alkali metal salt (A) in terms of alkali metal and ET is the ethylene content (mol %) of the ethylene-vinyl alcohol copolymer.

When the content of the alkali metal salt (A) is larger beyond the range provided by formula (1) above, the hue of the resin composition may get worse. On the other hand, when the content is less beyond the range provided by formula (1) above, the long-run workability and the adhesiveness may be reduced. The two contents more preferably satisfy the following formula (1') and still more preferably satisfy the following formula (1").

$$0.95 \times \exp(0.039 \times ET) - 1.5 \leq a \leq 0.95 \times \exp(0.039 \times ET) + 1 \quad (1')$$

$$0.95 \times \exp(0.039 \times ET) - 1 \leq a \leq 0.95 \times \exp(0.039 \times ET) + 1 \quad (1'')$$

The invented resin composition contains 0 to 2 μmol/g of a carboxylate radical (C1) which is extracted through an immersion treatment in water at 95° C. for 10 hours. Because most of the carboxylic acid and the salt thereof contained in an EVOH resin composition are assumed to be extracted through the immersion treatment in water at 95° C. for 10 hours, a value almost corresponding to the total content of the acid and salt is indicated for the carboxylate radical (C1). In other words, the invented resin composition is a resin composition having an extremely small content of a carboxylic acid and a salt thereof. The content of the carboxylate radical (C1) is preferably 1.5 μmol/g or less, more preferably 1 μmol/g or less, and still more preferably 0.5 μmol/g or less.

The invented resin composition contains 0 to 40 μmol/g of a carboxylate radical (C2) which is extracted through an immersion treatment in a 0.05 N aqueous sodium hydroxide solution at 95° C. for 10 hours. Through the immersion treatment in a 0.05 N aqueous sodium hydroxide solution at 95° C. for 10 hours, most of the carboxylic acid and the salt thereof contained in an EVOH resin composition are extracted. In addition, saponification reaction proceeds at most of the unsaponified carboxylic acid ester groups remaining in an EVOH resin and a carboxylate radical, which is a hydrolysis product, is liberated to be extracted. In other words, the invented resin composition is a resin composition having a small total content of a carboxylic acid, a salt thereof and a carboxylic acid ester group. The content of the carboxylate radical (C2) is preferably 20 μmol/g or less, more preferably 10 μmol/g or less, still more preferably 5 μmol/g or less, and most preferably 2 μmol/g or less.

During the melt molding of an EVOH resin composition, the temperature usually reaches 200° C. or higher. At such temperatures, many types of reactions can proceed. Carboxylic acid ester groups contained in an EVOH resin are expected to be hydrolyzed through a reaction with water to liberate carboxylic acids or are expected to undergo transesterification with carboxylic acids or carboxylic acid salts. Moreover, carboxylic acids or their salts are expected to react with hydroxyl groups in EVOH to form carboxylic acid ester groups or are expected to undergo transesterification with carboxylic acid ester groups. In other words, in melt-molding, especially, long melt-molding, such chemical reactions which occur within molten resin during the melting by heating cannot be disregarded.

This resin composition, which resulted from focusing attention in this respect, intends to achieve both improvement in melt stability of resin and prevention of generation of odor or sourness by controlling the sum of the contents of carboxylic acids, salts thereof and carboxylic acid esters, which can be converted reciprocally. By reducing, to an extremely small amount, a carboxylate radical (C1) which was originally and still is liberated and which is extracted through an immersion treatment in water at 95° C. for 10 hours and by controlling the amount of a carboxylate radical (C2) which is extracted through an immersion treatment in a 0.05 N aqueous sodium hydroxide solution at 95° C. for 10 hours, the amount being that of substances including what can be liberated under heating and melting conditions to a certain value or smaller, a resin composition extremely superior in long-run workability is obtained.

Another EVOH resin composition suitably used in the present invention is an ethylene-vinyl alcohol copolymer resin composition wherein the composition contains 0.1 to 20 μmol/g, in terms of alkali metal, of an alkali metal salt (A) and 0 to 2 μmol/g of a carboxylate radical (C1) which is extracted through an immersion treatment in water at 95° C. for 10 hours, and wherein the degree of saponification is 99.7 to 100 mol %.

This, which is a resin composition similar to the aforementioned resin composition, is expressed, in degree of saponification, the amount of unsaponified carboxylic acid ester groups instead of carboxylate radical (C2) which is extracted through an immersion treatment in a 0.05 N aqueous sodium hydroxide solution at 95° C. for 10 hours. When the degree of saponification of EVOH is 99.7 mol % or more, a good long-run workability at the time of melt molding is achieved. The degree of saponification is more preferably 99.8 mol % or more, still more preferably 99.9 mol % or more, and especially preferably 99.95 mol % or more.

It is preferable that the EVOH resin composition to be used in the present invention further contain a boron compound (B) because the generation of deposits at a dielip at the time of melt-molding can be inhibited. The effect of the incorporation of the boron compound (B) and the kind thereof are the same as those described in the description of the method for producing the EVOH resin composition. The content of the boron compound (B) is preferably 1 to 200 μmol/g in terms of boron element. It is more preferably 2 μmol/g or more, and still more preferably 3 μmol/g or more. On the other hand, it is more preferably 150 μmol/g or less, and still more preferably 100 μmol/g or less.

Moreover, it is preferable that the resin composition contain a phosphoric acid compound (D) for balancing the long-run workability and yellowing resistance at the time of melt molding, especially the yellowing resistance in high-temperature molding, and the interlayer adhesiveness. The effect of the incorporation of the phosphoric acid compound (D) and the kind thereof are the same as those described in the description of the method for producing the EVOH resin composition. The upper limit of the content of the phosphoric acid compound (D) is preferably 5 μmol/g, more preferably 4 μmol/g, still more preferably 3 μmol/g, and most preferably 1.5 μmol/g. Too much phosphate radical may cause a reduction in long-run workability. On the other hand, the lower limit of the content of the phosphoric acid compound (D), in terms of phosphate radical, is preferably 0.05 μmol/g, more preferably 0.1 μmol/g, still more preferably 0.15 μmol/g, and most preferably 0.2 μmol/g.

In this situation, it is preferable that in the resin composition the ratio (a/d) of the content (a: μmol/g) of the alkali metal salt (A) in terms of alkali metal to the content (d: μmol/g) of the phosphoric acid compound (D) in terms of phosphate radical be 2.4 to 50. This can result in a resin composition superior in hue and long-run workability. When the ratio (a/d) is less than 2.4, the long-run workability may be reduced. On the other hand, when the ratio (a/d) exceeds 50, the hue may get worse and, in some cases, the long-run workability will be affected. The ratio (a/d) is more preferably not more than 40, and still more preferably not more than 30.

The resin composition may also contain an alkaline earth metal salt (E). The effect of the incorporation of the alkaline earth metal salt (E) and the kind thereof are the same as those described in the description of the method for producing the EVOH resin composition. The content of the alkaline earth metal salt (E) is preferably 0 to 10 μmol/g in terms of alkaline earth metal. It is more preferably 5 μmol/g or less, and still more preferably 3 μmol/g or less. Especially, when importance is placed on inhibition of yellowing at the time of melt molding, the content of the alkaline earth metal salt (E) is more preferably not more than 2 μmol/g, and still more preferably not more than 1 μmol/g. It is preferable that substantially no alkaline earth metal salt (E) be contained.

A desirable melt flow rate (MFR) (measured at 190° C. under a load of 2160 g; however, when a melting point is around 190° C. or more, the measurements are carried out under 2160 g load at two or more temperatures not lower than the melting point. The results are plotted, in a semilog graph, with reciprocals of absolute temperatures as abscissa against logarithms of MFRs as ordinate and the MFR is represented by an extrapolation to 190° C.) of the EVOH resin composition for use in the present invention is preferably 0.1 to 200 g/10 min. The lower limit of MFR is more preferably not lower than 0.2 g/10 min, still more preferably not lower than 0.5 g/10 min, and most preferably not lower than 1 g/10 min. The upper limit of MFR is more preferably 50 g/10 min or lower, still more preferably 30 g/10 min or lower, and most preferably 15 g/10 min or lower. The cases where the melt flow rate is low beyond these ranges are not preferred because the inside of an extruder during molding will be in a high torque condition and it will become difficult to execute extrusion processing. The cases where the melt flow rate is high beyond those ranges are not preferred because the mechanical strength of molded articles will be insufficient.

It is also permitted to blend an EVOH differing in degree of polymerization, ethylene content and degree of saponification to the EVOH resin composition for use in the present invention and then perform melt molding. Moreover, it is also permitted to add appropriate amounts of various plasticizers, lubricants, stabilizers, surfactants, colorants, UV absorbers, antistatic agents, driers, crosslinking agents, metal salts, fillers and reinforcements such as various types of fiber. A resulting resin composition is subjected to a melt molding step preferably in the form of pellets.

The present invention is a blow molded container comprising the EVOH resin compositions. As a method for blow molding, either extrusion blow molding or injection blow molding can be adopted. As an extrusion blow molding method, a method in which a previously-extruded pipe is cut, cooled, heated and then subjected to blow molding is available. However, preferred is a method in which an extruded tubular molten parison is blow molded directly, namely a so-called direct blow molding method. Examples of an injection molding method include a method in which a bottomed parison is injection molded first and the parison is blow molded while being still in a high temperature during the course of cooling and a method in which an injected bottomed parison is cooled, subsequently heated again and then blow molded. In the practice of such blow molding, when the blow molding was conventional long-run molding, resulting bottles sometimes suffered from hard spots, yellowing or streaks. In contrast, the use of the EVOH resin composition can inhibit the occurrence of these defects. In particular, when the die temperature in extrusion blow molding or the nozzle temperature in injection blow molding is 250° C. or higher, those problems are likely to arise and therefore the use of the EVOH resin composition will offer a great benefit under such conditions.

The blow molded container of the present invention may either consist of a single layer made of the EVOH resin composition or comprise a multilayer structure having a layer of the EVOH resin composition and a layer of another thermoplastic resin. The container preferably comprises the multilayer structure because the EVOH resin composition used in the present invention is superior in interlayer adhesiveness. Examples of the layer constitution of the multilayer structure include, but are not limited to, E/T, T/E/T, E/Ad/T, T/Ad/E/Ad/T and T/E/T/E/T where the EVOH resin composition, an adhesive resin and a thermoplastic resin are represented by E, Ad and T, respectively. Each of the layers shown above may be a single layer or, in some cases, may include multiple layers.

Examples of the above-mentioned "another thermoplastic resin (T)" include homopolymers or copolymers of olefins such as linear low-density polyethylene, low-density polyethylene, medium-density polyethylene, high-density polyethylene, ethylene-vinyl acetate copolymer, ethylene-propylene copolymer, polypropylene, propylene-α-olefin copolymer (α-olefins having 4-20 carbon atoms), polybutene and polypentene, polyester such as polyethylene terephthalate, polyester elastomer, polyamide resin such as nylon-6 and nylon-6,6, polystyrene, polyvinyl chloride, polyvinylidene chloride, acrylic resin, vinyl ester resin, polyurethane elastomer, polycarbonate, chlorinated polyethylene and chlorinated polypropylene. As the adhesive resin (Ad), a carboxylic acid-modified polyolefin, especially, maleic anhydride-modified polyolefin is preferably employed. Regarding the thickness of each layer, the EVOH resin composition layers and the adhesive resin layers are approximately 5 to 300 μm thick and the layers of another thermoplastic resin are approximately 20 to 5000 μm thick.

As a method for producing a blow molded container comprising such a multilayer structure, coextrusion blow molding and coinjection blow molding are suitably employed.

One desirable example of the coextrusion blow molding method is so-called direct blow molding which comprises providing at least two extruders, charging an EVOH resin composition, another thermoplastic resin and, if necessary, an adhesive resin into separate extruders and kneading them separately, melt extruding them to extrude individual layers so as to unite them firmly together inside a multilayer parison forming die or outside the die just after their discharging to obtain a tubular multilayer parison, and then blow molding the parison in a molten state to obtain a multilayer container.

In the case where coextrusion blow molding, especially, direct blow molding is employed, the "another thermoplastic resin" is not particularly restricted but is preferably polyolefin. Of polyolefin, polyethylene and polypropylene are suitably employed. It is preferable that an adhesive resin layer be disposed between the layer of the EVOH resin composition and the polyolefin layer. Preferable layer constitutions include E/Ad/T and T/Ad/E/Ad/T where the EVOH resin composition, an adhesive resin and another thermoplastic resin (here, polyolefin) are represented by E, Ad and T, respectively.

In some applications, it is preferable that the EVOH resin composition be the innermost layer. For example, use of polyolefin for the innermost layer of fruit juice containers or citrus seasoning containers used to cause a problem that the sorption of flavor components of the content by the polyolefin occures, resulting in deterioration of taste. For avoiding this problem, it is possible to prevent the sorption by disposing an EVOH resin layer as the innermost layer. However, a problem of migration of acid taste to the content has been left pending for conventional EVOH resins. In such a case, forming the innermost layer of the EVOH resin composition containing less carboxylate radical makes it possible to inhibit acid taste to migrate. For example, in one of the above-mentioned layer constitutions, it is preferable to conduct blow molding in such a manner that the E (EVOH resin composition) layer in the structure E/Ad/T comes inside.

As a method of coinjection blow molding, preferably employed is a method in which a multilayer parison is obtained by injection molding using a multilayer injection molding machine having at least two screws and then the parison is blow molded while being cooled or the parison is cooled, subsequently heated again and then blow molded. When the multilayer parison is blow molded, the parison is preferably subjected to stretch blow molding, especially, biaxial stretch blow molding.

In the case where coinjection blow molding is conducted, the "another thermoplastic resin" is not particularly restricted but is preferably polyester or polyamide. Especially, use of polyester typified by polyethylene terephthalate is preferable because a blow molded container superior in strength can be obtained by biaxial stretch blow molding.

In the coinjection blow molded container of the present invention, an adhesive resin layer may be disposed between the EVOH resin composition layer and the layer of another thermoplastic resin, or both of these layers may be contacted directly together. Preferable layer constitutions include T/E/T, T/Ad/E/Ad/T and T/E/T/E/T where the EVOH resin composition, an adhesive resin and another thermoplastic resin (here, polyester or the like) are represented by E, Ad and T, respectively. Above all, a constitution composed only of an EVOH resin composition layer and a layer of another thermoplastic resin is preferred. Preferable examples are layer constitutions T/E/T and T/E/T/E/T. In other words, layer constitutions where layers of another thermoplastic resin, especially polyethylene terephthalate, are disposed on both sides of an EVOH resin composition layer are preferred. Also in the case where no adhesive resin layer is disposed between an EVOH resin composition layer and a layer of another thermoplastic resin, the coinjection blow molded container of the present invention has a superior interlayer adhesiveness and therefore has a superior impact delamination resistance. It is possible to inhibit the EVOH resin composition layer and the adjacent layer of another thermoplastic resin to delaminate from each other even when the coinjection blow molded container receives an impact or the like.

The application of the blow molded container of the present invention is not particularly restricted. It can be employed for a wide variety of applications where its superior gas barrier property and its superior interlayer adhesiveness are utilized. In particular, because the blow molded article of the present invention has a good appearance and is inhibited to generate odor and sourness, it can be employed suitably as various kinds of food packaging containers.

EXAMPLES

The present invention will be described in more detail below with reference to Examples, but the invention is not limited to the Examples. Unless otherwise specifically indicated, "%" and "part" are all by weight. In all cases, ion exchange water was used as water.

(1) Quantitative Determination of Alkali Metal Salt (A)

Dry EVOH resin composition pellets were ground by freeze grinding. The resulting ground EVOH resin composition was screened through a sieve having a nominal dimension of 1 mm (in accordance with Test Sieve Standard JIS Z 8801). Into a 100-mL Erlenmeyer flask with a ground stopper, 10 g of the screened EVOH resin composition powder and 50 mL of 0.01 N aqueous HCl solution were placed. Then a cooling condenser was fitted to the flask and heat extraction was conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation. Thus, the amounts of Na ion and K ion were determined. For the determination used were calibration curves prepared by use of aqueous sodium chloride solutions and aqueous potassium chloride solutions, respectively. Based on the thus-obtained amounts of Na ion and K ion, the amount of alkali metal salts (A), in terms of metal elements, contained in the dry EVOH resin composition pellets was determined. Ion chromatography measurement conditions:

Column: ICS-C25 manufactured by Yokogawa Electric Corporation.
Eluant: Aqueous solution containing 5.0 mM of tartaric acid and 1.0 mM of 2,6-pyridinedicarboxylic acid.
Measuring temperature: 40° C.
Eluant flow rate: 1 mL/min
Amount of sample injected: 50 μL (2) Quantitative Determination of Carboxylate Radical (C1) Extracted Through an Immersion Treatment in Water at 95° C. for 10 Hours Dry EVOH resin composition pellets were ground by freeze grinding. The resulting ground EVOH resin composition was screened through a sieve having a nominal dimension of 1 mm (in accordance with Test Sieve Standard JIS Z 8801). Into a 100-mL Erlenmeyer flask with a ground stopper, 10 g of the screened EVOH resin composition powder and 50 mL of ion exchange water were placed. Then a cooling condenser was fitted to the flask and extraction was conducted under stirring at 95° C. for 10 hours. 2 mL of the resulting extraction solution was diluted with 8 mL of ion exchange water. The diluted extraction solution was quantitatively analyzed using an ion chromatography IC7000 manufactured by Yokogawa Electric Corporation, whereby the amount of carboxylate (acetate) ion was determined. Thus, the amount of carboxylate radical (C1) was obtained. For the quantitative determination, a calibration curve prepared by use of aqueous acetic acid solutions was used. Ion chromatography measurement conditions:

Column: SCS5-252 manufactured by Yokogawa Electric Corporation.
Eluant: 0.1% aqueous phosphoric acid solution
Measuring temperature: 40° C.
Eluant flow rate: 1 mL/min
Amount of sample injected: 50 μL (3) Quantitative Determination of Carboxylate Radical (C2) Extracted Through Immersion Treatment in a 0.05 N Aqueous Sodium Hydroxide Solution at 95° C. for 10 Hours Dry EVOH resin composition pellets were ground by freeze grinding. The resulting ground EVOH resin composition was screened through a sieve having a nominal dimension of 1 mm (in accordance with Test Sieve Standard JIS Z 8801). Into a 100-mL Erlenmeyer flask with a ground stopper, 10 g of the screened EVOH resin composition powder and 50 mL of 0.05 N aqueous sodium hydroxide solution were placed. Then a cooling condenser was fitted to the flask and heat extraction were conducted under stirring at 95° C. for 10 hours. A sample solution for analysis was prepared by adding 7 mL of ion exchange water to 2 mL of the resulting extraction solution and then further adding 1 mL of 0.1N aqueous phosphoric acid solution. The amount of the carboxylate ion contained in the diluted extraction solution was quantitatively analyzed using an ion chromatography IC7000 manufactured by Yokogawa Electric Corporation, whereby the amount of carboxylate (acetate) ion was determined. Thus, the amount of carboxylate radical (C2) was obtained. For the quantitative determination, used was a calibration curve prepared by use of sample solutions each prepared by adding 7 mL of ion exchange water to 2 mL of a solution obtained by dilution of acetic acid with 0.05 N aqueous sodium hydroxide solution, and further adding 1 mL of 0.1 N aqueous phosphoric acid solution. Ion chromatography measurement conditions:

Column: SCS5-252 manufactured by Yokogawa Electric Corporation.
Eluant: 0.1% aqueous phosphoric acid solution
Measuring temperature: 40° C.
Eluant flow rate: 1 mL/min
Amount of sample injected: 50 μL (4) Quantitative Determination of Boron Compound (B)

50 mg of dry EVOH resin composition pellets for use as a sample was completely burned by oxygen-flask combustion technique. The resulting combustion ash was dissolved in 10 mL of 1 mol/L aqueous nitric acid solution. Using this solution, the content of a boron compound (B) in terms of boron element was determined by high-frequency plasma emission spectrometry (by means of an ICP emission analyzer IRIS AP manufactured by Jarrell Ash Corporation).

(5) Quantitative Determination of Phosphoric Acid Compound (D)

Dry EVOH resin composition pellets for use as a sample were ground by freeze grinding. The resulting ground EVOH resin composition was screened through a sieve having a nominal dimension of 1 mm (in accordance with Test Sieve Standard JIS Z 8801). Into a 100-mL Erlenmeyer flask with a ground stopper, 10 g of the screened EVOH resin composition powder and 50 mL of 0.01 N aqueous HCl solution were placed. Then a cooling condenser was fitted to the flask and extraction were conducted under stirring at 95° C. for 4 hours. The resulting extraction solution was quantitatively analyzed using an ion chromatography IC7000 manufactured by Yokogawa Electric Corporation, whereby the amount of phosphate ion was determined. Thus, the amount of phosphate radical was obtained. For the quantitative determination, a calibration curve prepared by use of aqueous sodium dihydrogen phosphate solutions was used. Ion chromatography measurement conditions:

Column: ICS-A23 manufactured by Yokogawa Electric Corporation.

Eluant: Aqueous solution containing 2.5 mM of sodium carbonate and 1.0 mM of sodium hydrogencarbonate.

Measuring temperature: 40° C.

Amount of sample injected: 50 μL (6) Measurement of Degree of Saponification (NMR Method)

Dry EVOH pellets were ground by freeze milling. The resulting ground EVOH was screened through a sieve having a nominal dimension of 1 mm (in accordance with Test Sieve Standard JIS Z 8801). An operation cycle composed of immersing 5 g of the sieved EVOH powder in 100 g of ion exchange water, stirring at 85° C. for 4 hours, dewatering and drying was repeated twice. The resulting washed powdery EVOH was subjected to NMR measurement under the measurement conditions shown below. The degree of saponification was then determined by the analysis method provided below.

Measurement Conditions

Device: Superconducting nuclear magnetic resonance analyzer Lambda500 manufactured by JEOL Observation frequency: 500 MHz Solvent: DMSO-d6

Polymer concentration: 4% by weight

Measurement temperature: 40° C. and 95° C.

Accumulation: 600 times

Pulse delay time: 3.836 sec

Sample rotation speed: 10 to 12 Hz

Pulse width (900 pulse): 6.75 μsec

Analysis Method

In the measurement at 40° C., a peak of hydrogen in a water molecule appeared near 3.3 ppm. This peak overlapped a 3.1 to 3.7 ppm part of the peak of the methine hydrogens in the vinyl alcohol units of EVOH. On the other hand, in the measurement at 95° C., the overlapping occurred at 40° C. was eliminated, but a peak existing near 4 to 4.5 ppm of the hydrogens in the hydroxyl groups in vinyl alcohol units of EVOH overlapped a 3.7 to 4 ppm part of the peak of the methine hydrogens in vinyl alcohol units of EVOH. In the determination of the quantity of the methine hydrogens (3.1 to 4 ppm) in the vinyl alcohol units of EVOH, data measured at 95° C. were adopted for the region of 3.1 to 3.7 ppm and data measured at 40° C. were adopted for the region of 3.7 to 4 ppm for the purpose of avoidance of overlap with the peaks of the hydrogen of water or the hydroxyl group. Thus, the total amount of the methine hydrogens are determined as the sum of those data. It is known that the peak of hydrogen of water or a hydroxyl group shifts toward higher magnetic fields with increase in measurement temperature.

Therefore, analysis was done by use of both measurements at 40° C. and 95° C. in the following manner. An integral ($I_1$) of the peaks at a chemical shift of 3.7 to 4 ppm and an integral ($I_2$) of the peaks at a chemical shift of 0.6 to 1.8 ppm are determined from the spectrum measured at 40° C. An integral ($I_3$) of the peaks at a chemical shift of 3.1 to 3.7 ppm, an integral ($I_4$) of the peaks at a chemical shift of 0.6 to 1.8 ppm, and an integral ($I_5$) of the peaks at a chemical shift of 1.9 to 2.1 ppm are determined from the spectrum measured at 95° C. The peak of a chemical shift of 0.6 to 1.8 ppm derives mainly from methylene hydrogens, whereas the peak of a chemical shift of 1.9 to 2.1 ppm derives from methyl hydrogens in the units of unsaponified vinyl acetate. Based on these integral values, a degree of saponification was calculated according to the following formula:

$$\text{Degree of saponification} = \frac{(I_1/I_2 + I_3/I_4) \times 100}{(I_1/I_2 + I_3/I_4) + (I_5/I_4)/3}$$

(7) Intrinsic Viscosity 0.20 g of dry EVOH pellet for use as a sample was weighed precisely and then dissolved in 40 mL of hydrous phenol (water/phenol=15/85% by weight) by heating at 60° C. for 4 hours. Measurement was conducted (t0=90 sec) at a temperature of 30° C. using an Ostwald viscometer. An intrinsic (limiting) viscosity [η] was calculated from the following formula:

$$[\eta] = (2 \times (\eta sp - \ln \eta rel))^{1/2}/C \text{ (L/g)}$$

ηsp=t/t0−1 (specific viscosity)

ηrel=t/t0 (relative viscosity)

C: EVOH concentration (g/L)

t0: time required for a blank (hydrous phenol) to pass the viscometer t: time required for hydrous phenol containing a sample dissolved therein to pass the viscometer (8) Measurement of Water Content of Hydrous EVOH Pellets The water content of EVOH pellets were measured under conditions including a drying temperature of 180° C., a drying time of 20 minutes and a sample weight of about 10 g by means of a halogen moisture analyzer HR73 manufactured by METTLER.

(9) Measurement of Carbon Dioxide Gas Concentration

Using a portable pH and ion meter (IM-22P) connected to a carbon dioxide gas sensor (CE-2041) manufactured by DKK-TOA Corp., the carbon dioxide gas concentration in a solution was measured.

Example 1

Preparation of EVOH Resin Composition

Into a saponification reactor having a capacity of 470 L, 50 kg of a 45% methanol solution of an ethylene-vinyl acetate copolymer having an ethylene content of 32 mol % and 129 kg of methanol were charged and the internal temperature was adjusted to 60° C. while nitrogen gas was blown into the reactor. 29 L of a sodium hydroxide solution (concentration: 80 g/L) in methanol was added thereto and saponification reaction was started. During the saponification reaction, nitrogen gas was blown continuously into the reactor in order to exhaust methyl acetate formed in the reaction system as a by-product out of the reaction system together with the methanol in the reaction system for the purpose of improving the reaction efficiency. The exhaustion rate was about 20 kg/hr in total of methyl acetate and methanol. The exhaust was condensed in a cooling condenser to be recovered. After a lapse of two hours since the start of the reaction, 29 L of a sodium hydroxide solution (concentration: 80 g/L) in methanol was further added to finish up the saponification reaction. After a lapse of six hours since the reaction was started, 6.8 kg of acetic acid and 56 L of water were added to neutralize the reaction solution, thereby stopping the reaction.

The reaction solution neutralized was transferred from the reactor into a drum. It was left stand at room temperature for 16 hours to be cooled and solidified into cake form. Then, the cake-form resin was dewatered by use of a centrifuge (H-130 manufactured by KOKUSAN Corporation, rotation speed 1200 rpm). Subsequently, a step of washing the resin with water by continuously supplying ion exchange water to the central portion of the centrifuge from above and simultaneously dewatering was done for 10 hours. The wash obtained after a lapse of 10 hours since the beginning of the washing had a conductivity of 30 μS/cm (measured by CM-30ET manufactured by DKK-TOA Corporation).

The granular EVOH obtained in this way was dried at 60° C. for 48 hours using a drier. 20 kg of the dried granular EVOH was dissolved in 43 L of water/methanol mixed solution (weight ratio: water/methanol=4/6) at 80° C. for 12 hours under stirring. Then, the stirring was stopped and the temperature in the dissolution vessel was dropped to 65° C. By leaving for five hours, the EVOH solution in water/methanol was degassed. The solution was extruded into a water/methanol mixed solution (weight ratio: water/methanol=9/1) at 5° C. through a metal plate having a circular opening 3.5 mm in diameter to form a strand-like solid, which was cut to yield pellets about 4 mm in diameter and about 5 mm in length.

An operation composed of charging 2.4 kg of the thus obtained hydrous pellets and 24 L of ion exchange water in a plastic container having a height of 400 mm and an opening diameter of 370 mm, washing at 25° C. for two hours while stirring, and then dewatering was repeated twice. Then, an operation composed of adding 24 L of 1 g/L aqueous acetic acid solution to 2.4 kg of the hydrous pellets, washing at 25° C. for two hours while stirring and then dewatering was repeated twice. Moreover, an operation composed of adding 24 L of ion exchange water to 2.4 kg of the hydrous pellets, washing at 25° C. for two hours while stirring and then dewatering was repeated six times. The wash obtained after the sixth washing was measured for its conductivity using a CM-30 ET manufactured by DKK-TOA Corporation. As a result, the wash had a conductivity of 3 μS/cm. The water content of the resulting EVOH pellets was 50% by weight.

Into a plastic container having a height of 300 mm and an opening diameter of 280 mm, 2.4 kg of the thus obtained hydrous pellets of washed EVOH (ethylene content: 32 mol %, degree of saponification: 99.98 mol % or more (calculated by NMR), intrinsic viscosity: 0.085 L/g) and 5.1 L of aqueous boric acid solution having a concentration of 0.36 g/L were charged. Then, immersion was done at 25° C. for 10 hours and thereafter the pellets were dewatered.

Next, 24 L of ion exchange water was charged into a plastic container having a height of 400 mm and an opening diameter of 370 mm. A silicone tube (inner diameter: 7 mm; outer diameter: 10 mm) was inserted into the ion exchange water contained in the container and carbon dioxide gas was blown thereinto for 2 hours by bubbling at a rate of 5 L/min, wherein five silicone tubes were used. The carbon dioxide gas was fed by use of a carbon dioxide gas cylinder (30 kg of liquefied carbon dioxide gas manufactured by Nippon Tansan Co., Ltd.) and a flow meter (Model RK-1600R manufactured by Kojima Instruments Inc.). In the water into which carbon dioxide gas was blown, 1.68 g of boric acid, 6.48 g of dipotassium hydrogenphosphate and 1.20 g of phosphoric acid were dissolved and blowing of carbon dioxide gas was continued for another one hour at a rate of 5 L/min. The treatment solution had a boric acid content of 0.07 g/L, a dipotassium hydrogenphosphate content of 0.27 g/L, and a phosphoric acid content of 0.05 g/L. The pH of the treatment solution after the 1-hour blowing of carbon dioxide gas was measured using a pH meter (MA235 manufactured by METTLER. The treatment solution had a pH of 4.9.

While the blowing of carbon dioxide gas at a blowing rate of 5 L/min was continued, 2.4 kg of the hydrous pellets were charged into the treatment solution and were subjected to immersion and stirring at 25° C. for six hours. During the period ranging from the beginning of the treatment to the end of the treatment, the pH of the treatment solution was measured at every one-hour interval. The pH of the treatment solution was kept at 4.9 at all measurements with no fluctuations. The carbon dioxide gas concentration in the treatment solution was analyzed to be 20 mmol/L. After the 6-hour immersion and stirring in the treatment solution followed by stirring, the resulting pellets were dewatered immediately and then were subjected to hot-air drying at 80° C. for three hours and successively at 107° C. for 24 hours, yielding dry EVOH resin composition pellets (water content: 0.2% by weight).

The alkali metal salt (A) contained in the resulting dry EVOH resin composition pellets was potassium and the content of the alkali metal salt (A) was 3.40 μmol/g in terms of metal element. The content of the phosphoric acid compound (D) was 1.2 μmol/g in terms of phosphate radical. The content of a boron compound (B) in the resulting dry EVOH resin composition pellets was 143 ppm (13 μmol/g) in terms of boron element. The amount of the carboxylate radical (C1) extracted through an immersion treatment of the dry EVOH resin composition pellets in water at 95° C. for 10 hours was 0 ppm (0 μmol/g). The amount of the carboxylate (acetate) radical (C2) extracted through an immersion treatment in a 0.05 N aqueous sodium hydroxide solution at 95° C. for 10 hours was 36 ppm (0.6 μmol/g). The MFR of the dry EVOH resin composition pellets was 1.6 g/10 min (at 190° C. under a load of 2160 g). The results of the analysis of the EVOH resin composition are summarized in Table 1.

[Production of 5-Layer Coextrusion-Direct-Blow-Molded Container]

Using the EVOH resin composition obtained in the way described above, a 5-layer coextrusion-direct-blow-molded container was produced. A low density polyethylene (LDPE) "MIRASON 102" manufactured by Mitsui Chemicals, Inc. was used as the "another thermoplastic resin (T)". In addition, an ethylene-acrylic ester-maleic anhydride terpolymer "Bondine TX8030" manufactured by Sumitomo Chemical Co., Ltd. was used as the adhesive resin (Ad). Molding conditions are as follows.

Molding machine: Four-kind seven-layer direct blow molding machine manufactured by Suzuki Tekkosho Co.
   EVOH resin composition extrusion temperature: 210° C.
   Low-density polyethylene extrusion temperature: 195° C.
   Adhesive resin extrusion temperature: 195° C.
   Mold temperature: 15° C.
   Bottle capacity: 1000 ml
   Layer constitution: LDPE/Ad/EVOH/Ad/LDPE=340/20/40/20/340 (μm)

Interlayer Adhesiveness

A piece having a size of 1.5 cm×18 cm was cut off from the multilayer bottle. Using an autograph, the T-type peel strength between the EVOH layer and the adhesive layer (located closer to the innermost layer) immediately after the bottle molding was measured at a tensile strength of 250 mm/min and a chuck distance of 20 mm. The peel strength was 6.5 kg/15 mm. The result of the evaluation is shown in Table 2.

Appearance of Bottle (Hard Spots)

When multilayer bottles were molded continuously for 72 hours, hard spots formed in the bottles were visually observed. However, no formation of hard spots was recognized and the bottles had a good appearance. The result of the evaluation is shown in Table 2.

Appearance of Bottle (Yellowing)

When multilayer bottles were molded continuously for 72 hours, the hue of the bottles was visually judged. The bottles exhibited no yellowing and had a good appearance. The result of the evaluation is shown in Table 2.

[Production of 3-Layer Coextrusion-Direct-Blow-Molded Container]

Using the EVOH resin composition obtained in the way described above, a 3-layer coextrusion-direct-blow-molded container was produced. A low density polyethylene (LDPE) "MIRASON 102" manufactured by Mitsui Chemicals, Inc. was used as the "another thermoplastic resin (T)". In addition, an ethylene-acrylic ester-maleic anhydride terpolymer "Bondine TX8030" manufactured by Sumitomo Chemical Co., Ltd. was used as the adhesive resin (Ad). Molding conditions are as follows.

Molding machine: Four-kind seven-layer direct blow molding machine manufactured by Suzuki Tekkosho Co.
EVOH resin composition extrusion temperature: 210° C.
Low-density polyethylene extrusion temperature: 195° C.
Adhesive resin extrusion temperature: 195° C.
Mold temperature: 15° C.
Bottle capacity: 1000 ml
Layer constitution: (inside) EVOH/Ad/LDPE (outside)= 40/20/340 (μm)

Organoleptic Test for Taste

The bottle just after molding was filled with mineral water and was left at room temperature for 30 minutes. Then, an organoleptic test for taste of the mineral water was carried out. The water had no particular taste problem and it had no sourness. The result of the evaluation is shown in Table 2.

[Production of 3-Layer Coinjection-Blow-Molded Container]

Using the EVOH resin composition obtained in the way described above, a 3-layer coinjection-blow-molded container was produced. A polyethylene terephthalate (PET) "PET9921W" manufactured by VORIDIAN was used as the "another thermoplastic resin (T)".

Coinjection molding was carried out continuously for 24 hours using a coinjection molding machine (model SL160, four-cavity) manufactured by KORTEC/HUSKY. Thus, two-kind three-layer PET/EVOH/PET bottomed parisons were molded. In the molding, the temperature of the injection machine for PET, the temperature of the injection machine for EVOH, the temperature of the hot runner block where PET and EVOH meet together, the core temperature of the injection mold, and the cavity temperature of the injection mold were set at 280° C., 210° C., 270° C., 10° C. and 10° C., respectively. The injection rate and the injection amount were adjusted so that the thickness ratio of the PET layers to the EVOH layer in a container becomes 95/5. The resulting parison was visually observed and neither yellowing nor streaks were recognized.

Then, using a stretch blow molding machine (model LB01, one 530-mL cavity) manufactured by CRUPP CORPOPLAST MASCHINENBAU, a bottomed parison obtained just after the 24-hour continuous molding was heated to a surface temperature of 105° C. and then was stretch blow molded. Thus, a two-kind three-layer coinjection stretch blow molded container was obtained. The thickness constitution of the container was (inside) PET/EVOH/PET (outside)=140/ 25/180 (μm).

Frequency of Delamination

One hundred bottles obtained in the above-described way each were filled with water and sealed hermetically under normal pressure. Each bottle was held with its body horizontal and was dropped spontaneously from a height of 50 cm only once onto a 20 cm-long stand having a 90°-angled triangular cross section so that the 90°-angled corner of the stand hit the center of the body of the bottle. From the number of the bottles delaminated in the test, the frequency of delamination was calculated according to the following formula:

Frequency of Delamination (%)=[(number of the bottles delaminated)/100]×100 (%)

Appearance of Bottle

When the appearance of a bottle obtained was visually observed, no hard spot was found. Moreover, neither yellowing nor streaks were recognized. The results of the above-described evaluations are summarized in Table 2.

Comparative Example 1

Into a plastic container having a height of 300 mm and an opening diameter of 280 mm, 2.4 kg of the hydrous pellets obtained in the same manner as that in Example 1 and 5.1 L of an aqueous boric acid solution having a concentration of 0.36 g/L were charged. Then, immersion was done at 25° C. for 10 hours thereafter the pellets were dewatered.

Subsequently, the dewatered hydrous pellets were immersed in 5.1 L of aqueous solution containing 0.50 g/L of acetic acid, 0.27 g/L of dipotassium hydrogenphosphate, 0.05 g/L of phosphoric acid and 0.07 g/L of boric acid at 25° C. for six hours. Thereafter the pellets were dewatered and then were subjected to hot-air drying at 80° C. for three hours and successively at 107° C. for 24 hours, yielding dry EVOH resin composition pellets (water content: 0.2% by weight). Using the dry pellets obtained, evaluations were conducted in the same manners as those in Example 1. The compositions of the dry EVOH resin composition and the results of its evaluations are shown in Tables 1 and 2, respectively.

TABLE 1

| | Assay Values of EVOH Resin Composition | | | | | | |
|---|---|---|---|---|---|---|---|
| | Ethylene content (ET) (mol %) | Degree of saponification (mol %) | Alkali metal salt (A) (μmol/g) | Bboron compound (B) (μmol/g) | Carboxylate radical (C1) (μmol/g) | Carboxylate radical (C2) (μmol/g) | Phosphoric acid compound (D) (μmol/g) |
| Example 1 | 32 | 99.98 or more | 3.4 | 13 | 0 | 0.6 | 1.2 |
| Comparative Example 1 | 32 | 99.98 or more | 3.1 | 13 | 6.9 | 7.7 | 1 |

TABLE 2

| | Five-layer coextrusion direct blow molded container | | | Three-layer coextrusion direct blow molded container Organoleptic test (taste) | Three-layer coinjection blow molded container | | | |
|---|---|---|---|---|---|---|---|---|
| | Peel strength (kg/ 15 mm) | Appearance of bottle after 72-hour molding (hard spots) | Appearance of bottle after 72-hour molding (color) | | Appearance of bottle after 24-hour molding (hard spots) | Appearance of bottle after 24-hour molding (color) | Appearance of bottle after 24-hour molding (streaks) | Frequency (%) of delamination after 24-hour molding |
| Example 1 | 6.5 | Good | No yellowing | Good | Good | No yellowing | No appearance | 12 |
| Comparative Example 1 | 3.5 | Hard spots appeared | Yellowing | Sourness | Hard spots appeared | Yellowing | Streaks appeared | 35 |

What is claimed is:

1. A blow molded container made of an ethylene-vinyl alcohol copolymer resin composition comprising an ethylene-vinyl alcohol copolymer resin as the only ethylene-vinyl alcohol copolymer resin in the composition, wherein the composition contains 0.1 to 20 μmol/g, in terms of alkali metal, of an alkali metal salt (A) and 0 to 2 μmol/g of a carboxylate radical (C1) which is extracted through an immersion treatment in water at 95° C. for 10 hours, and wherein the degree of saponification of the ethylene-vinyl alcohol copolymer resin is 99.9 to 100 mol %.

2. The blow molded container according to claim 1, wherein an ethylene content of the ethylene-vinyl alcohol copolymer is 5 to 60 mol %.

3. The blow molded container according to claim 1, wherein the alkali metal salt (A) is a potassium salt.

4. The blow molded container according to claim 1, wherein the relation between the content (a: μmol/g), in terms of alkali metal, of the alkali metal salt (A) in the ethylene-vinyl alcohol copolymer resin composition and the ethylene content (ET: mol %) of the ethylene-vinyl alcohol copolymer satisfies the following formula (1):

$$0.95 \times \exp(0.039 \times ET) - 2 \leq a \leq 0.95 \times \exp(0.039 \times ET) + 2 \quad (1).$$

5. The blow molded container according to claim 1, wherein the ethylene-vinyl alcohol copolymer resin composition further contains 1 to 200 μmol/g, in terms of boron element, of a boron compound (B).

6. The blow molded container according to claim 1, wherein the container comprises a multilayer structure having a layer of the ethylene-vinyl alcohol copolymer resin composition and a layer of another thermoplastic resin.

7. The blow molded container according to claim 6, wherein the thermoplastic resin is polyolefin.

8. The blow molded container according to claim 6, wherein the thermoplastic resin is polyamide or polyester.

9. The blow molded container according to claim 6, wherein the layer of the ethylene-vinyl alcohol copolymer resin composition is the innermost layer.

* * * * *